United States Patent [19]

Gagliardi

[11] 4,011,846
[45] Mar. 15, 1977

[54] ANTI-POLLUTION DEVICE

[75] Inventor: Joseph F. Gagliardi, Orlando, Fla.

[73] Assignee: Did-Mor Engineering and Manufacturing Co., Chattanooga, Tenn.

[22] Filed: Mar. 24, 1975

[21] Appl. No.: 561,551

[52] U.S. Cl. .................. 123/119 A; 123/119 B
[51] Int. Cl.² .................................... F02M 25/06
[58] Field of Search ......... 123/119 B, 41.86, 119 A

[56] References Cited

UNITED STATES PATENTS

| | | | |
|---|---|---|---|
| 1,751,910 | 3/1930 | Dozier | 123/41.86 |
| 2,450,864 | 10/1948 | Callaway et al. | 123/119 B |
| 3,224,188 | 12/1965 | Barlow | 123/119 B |
| 3,362,386 | 1/1968 | McMahon | 123/119 B |
| 3,621,825 | 11/1971 | Ojala | 123/119 B |
| 3,712,281 | 1/1973 | Ruth | 123/119 B |
| 3,846,980 | 11/1974 | De Palma | 123/119 B |
| 3,875,916 | 4/1975 | Patton | 123/119 B |

FOREIGN PATENTS OR APPLICATIONS 999,735  10/1951   France ........................... 123/119 B

*Primary Examiner*—Wendell E. Burns
*Attorney, Agent, or Firm*—Newton, Hopkins & Ormsby

[57] ABSTRACT

A method is disclosed for controlling pollution emission of an internal combustion engine which method includes the steps of mixing gases exhausted from the engine combustion chambers with gases exhausted from the engine crankcase and then directing the mixed gases back to the combustion chambers. For practicing the method a pollution control device is also disclosed which included means for receiving and mixing together gases from an engine exhaust manifold and crankcase, and means for directing the mixed gases to engine combustion chambers.

10 Claims, 6 Drawing Figures

ANTI-POLLUTION DEVICE

BACKGROUND OF THE INVENTION

Today, automobile internal combustion engines are a principal source of air pollution. During the combustion process various pollutants are formed and released into the atmosphere. These pollutants include unburned hydrocarbons, carbon monoxide, and various oxides of nitrogen. Though these pollutants are eminated principally from combustion chambers a very substantial amount also arise from crankcase vapor emissions. These pollutants arise from "blow-by" gases which escape past the piston rings in the engine cylinders during the power stroke. When the mixture of fuel and air in each cylinder is ignited the gases and gas borne particulates formed in the cylinders are blown past the rings and into the crankcase.

To minimize the pollution created by crankcase gas emissions a system of positive crankcase ventilation has been developed. With this system the blow-by gases from a crankcase are routed back into the engine combustion chambers through the engine intake manifold. Such systems include a PCV valve which serves to adjust the flow of crankcase blow-by gases to the flow of the air-fuel mixture developed in the carburator and also to prevent the air-fuel mixture from being drawn into the crankcase itself. Although this system does remove a substantial portion of the pollutants which otherwise would be admitted to the atmosphere from the crankcase it has failed to eliminate completely such emissions due to the fact that the recycled pollutants from the crankcase are not totally burned in the engine combustion chambers in which case they are passed to the atmosphere through the exhaust manifold. To minimize this problem positive crankcase ventilation systems have been provided with filtering means and with heating means for heating the vapors from the crankcase prior to entry into the engine intake manifold as disclosed in U.S. Pat. No. 3,779,221. These improved systems however have not proved efficient nor really effective in achieving substantial reductions in crankcase emissions of pollutants into the atmosphere.

Accordingly, it is a general object of the present invention to provide an improved method for controlling pollution emissions of internal combustion engines and to provide means for practising this method.

More specifically, it is an object of the present invention to provide a pollution control device for effecting a substantial reduction in atmospheric pollution resulting from pollutants eminating from internal combustion engine crankcases.

Another object of the invention is to provide a pollution control device for an internal combustion engine of relatively simple and economic construction and with one which may be installed and serviced with facility.

Yet another object of the invention is to provide a pollution control device for an internal combustion engine which may not degrade but actually enhance mileage efficiency.

SUMMARY OF THE INVENTION

In one form of the invention a method is provided for controlling pollution emission of an internal combustion engine. The method comprises the steps of mixing gases exhausted from the engine combustion chambers with gases exhausted from the engine crankcase and then directing the mixed gases back to the combustion chambers.

In another form of the invention a pollution control device is provided for an internal combustion engine having an intake manifold through which combustible fluids are introduced into combustion chambers, an exhaust manifold through which gases are exhausted from the combustion chambers, and a crankcase. The pollution control device includes a chamber having a first inlet coupled with a crankcase, a second inlet coupled with the exhaust manifold, and an outlet coupled with the intake manifold.

In another form of the invention a pollution control device is provided for an internal combustion engine which device comprises a housing having a first inlet for receiving fluids from an engine crankcase, a second inlet for receiving fluids from an engine exhaust manifold, and an outlet for returning fluids to the engine combustion chambers. A first partition having an opening therethrough is mounted within the device housing between the inlets and the outlet to separate a fluid mixing compartment adjacent the inlets from a fluid heating compartment. A second partition having at least one aperture therethrough is mounted within the housing between the first partition and the outlet to separate a fluid filtering compartment adjacent the outlet from the fluid heating compartment. A tube having at least one port therein is mounted within the housing extending through the fluid mixing compartment between the second inlet and the first partition opening.

DETAILED DESCRIPTION OF THE DRAWING

Figure 1:
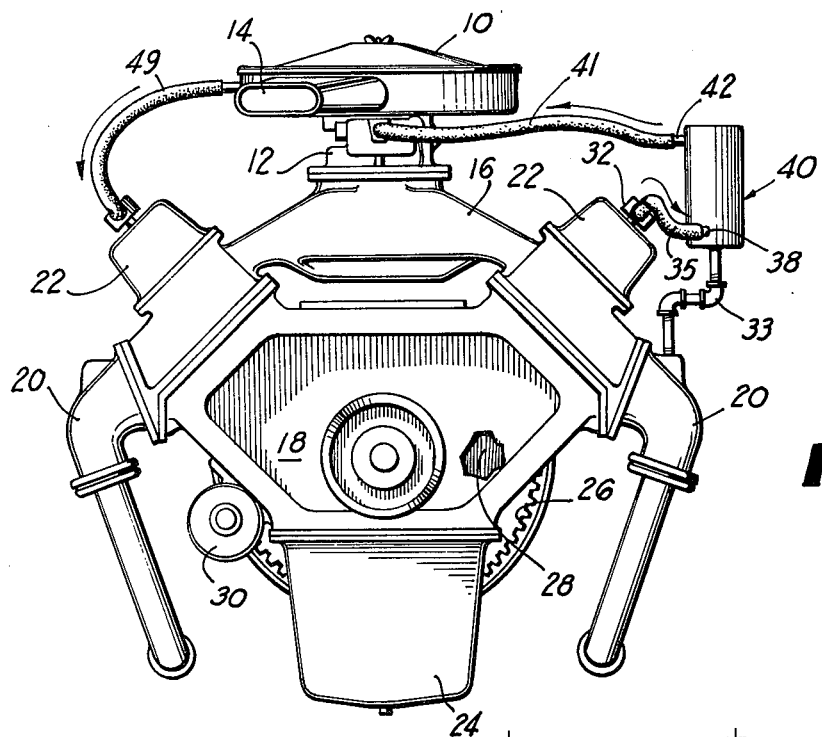
FIG. 1 is a front view in elevation of a conventional V-8 internal combustion engine having a pollution control device embodying principles of the present invention mounted thereto.

Referring now in more detail to the drawing, there is shown in FIG. 1 a conventional V-8 internal combustion engine which includes an air filter housing 10 mounted atop a carburetor 12 which housing includes an air intake 14. Carburetor 12 is mounted atop the engine intake manifold 16 atop engine block 18. The engine exhaust manifold 20 extends downwardly from the sides of the block while a pair of valve covers 22 are mounted atop the manifolds. An oil pan 24 is mounted beneath the engine block in front of flywheel 26 while the end of crankcase 28 is shown extending from the block. The valve cover, oil pan and crankcase are all provided with fluid communications therebetween and, for purposes of this application, may all be considered to form a part of the crankcase. A conduit 49 is provided between the air filter housing and valve covers through which fresh air may be drawn into the crankcase.

A starter motor 30 is shown mounted to the left of the oil pan. The engine is also, of course, provided with eight conventional combustion chambers in each of which a piston is reciprocally mounted in conventional fashion together with a spark plug, and intake and exhaust valves having actuation linkage disposed within the valve covers.

The just described, conventional V-8 internal combustion engine is provided with a positive crankcase ventilation system which includes a PCV valve 32 mounted atop valve cover 22. As previously stated the PCV valve insures that the flow of fluids therethrough are unidirectional towards the engine intake manifold. From the PCV valve extends a conduit 35 to an inlet 38 of a pollution control device 40 embodying principles of the invention while a conduit 33 extends from the engine exhaust manifold 20 to another inlet 39 of the device. A third conduit 41 extends from the device outlet 42 to carburetor 12.

Figure 2:
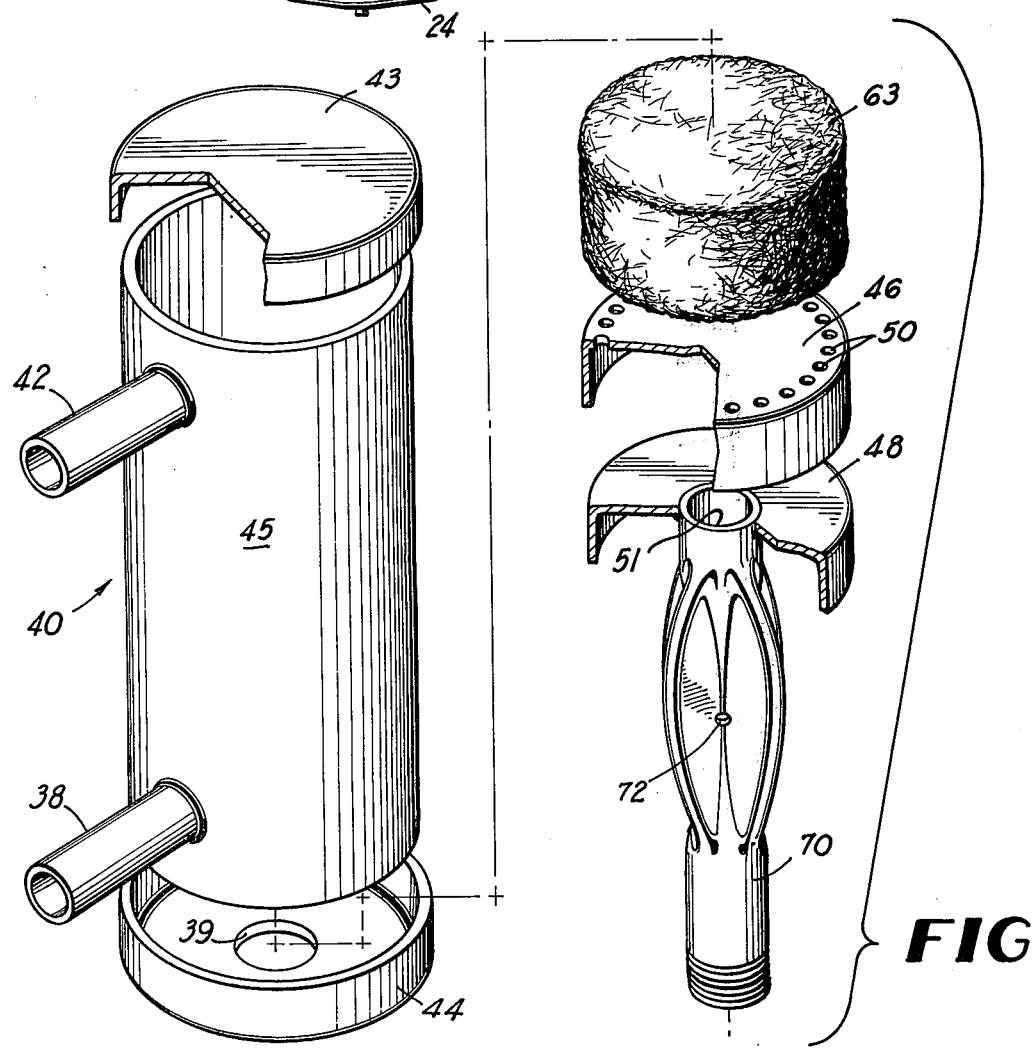
FIG. 2 is an exploded view, in perspective, of one embodiment of the pollution control device shown in FIG. 1.
Figure 3:
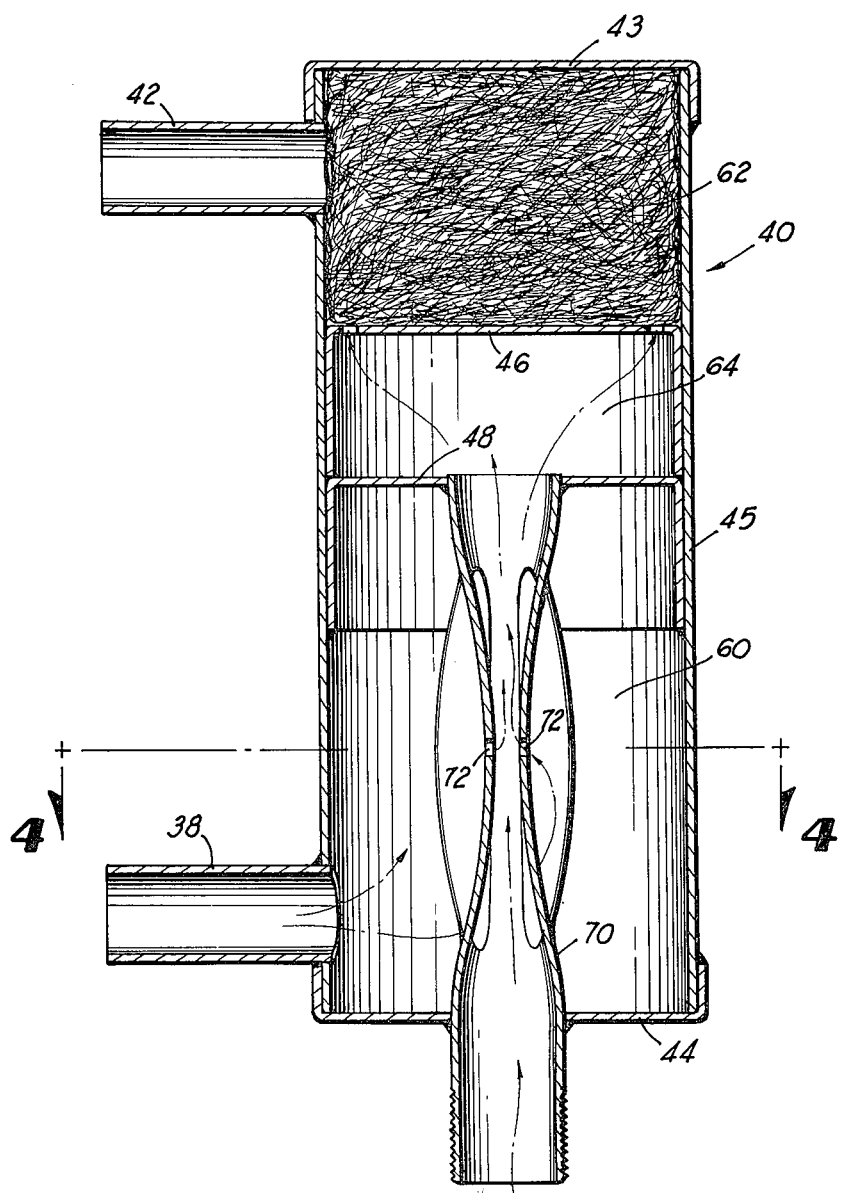
FIG. 3 is a transverse view in cross section of the device shown in FIG. 2.
Figure 4:
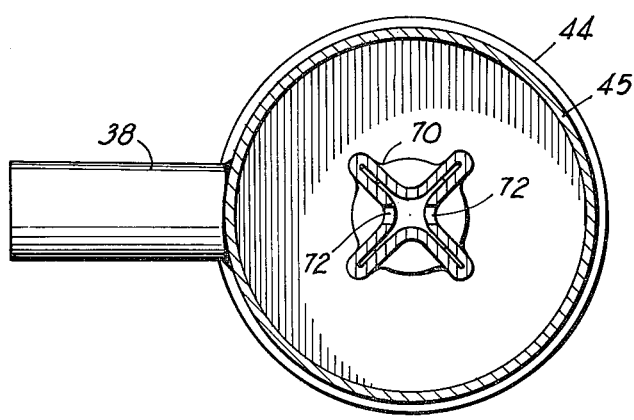
FIG. 4 is a cross sectional view of the device shown in FIG. 3 taken along plane 4—4.

With reference next to FIGS. 2-4, the pollution control device 40 is seen in more detail to include a cylindrical stainless steel housing 45 closed at each end by end walls 43 and 44. The device interior chamber is compartmentalized by means of two spaced partitions 46 and 48 mounted transverse the axis of the cylindrical housing by means of cylindrical partition flanges which are press fitted into the housing. Partition 46 is seen to include a set of relatively small apertures 50 arranged radially about the axis of the housing while partition 48 includes a central opening 51 disposed along the housing axis. Partitions 46 and 48 serve to divide the interior of the device into a mixing compartment 60 disposed adjacent inlets 38 and 39, a filtering compartment 62 disposed adjacent outlet 42, and a heating compartment 64 disposed between the two partitions. A tube 70 is mounted within the mixing chamber extending along the axis of the cylindrical housing between inlet 39 formed in end wall 44 and the central opening formed in partition 48. The midportion of the tube intermittant the tube ends is crimped to provide a narrowing of the tube bore intermittant its ends. At or near the point of smallest bore diameter is provided two small ports 72 which provide fluid communication between both sides of the tube within the mixing compartment. The filter compartment 62 at the other end of the housing is filled with filtering material 63 preferably composed of steel wool.

In operation, air is drawn into carburetor 12 through intake 14 and filter housing 10 and therein mixed with combustible fluid. The mixture is then passed through the intake manifold and intake valves into the combustion chamber where combustion occurs upon ignition. Following this the combusted fluids are exhausted from the combustion chambers through the outlet valves, and the exhaust manifold.

During the just described cycle of operation air is drawn from ambient atmosphere into the crankcase through unshown air vents, through PCV valve 32, and into inlet 38 of the pollution control device 40. Simultaneously, a portion of the engine exhaust is drawn from the exhaust manifold prior to exhaust exit to ambient atmosphere through conduit 33 into inlet 39 of device 40. With reference to FIG. 3, it may more clearly be seen that the exhaust entering device inlet 39 is directed through tube 70 onto the central portion of partition 46 at relatively high velocities. This action causes particulated matter within the exhaust to be deposited onto the central portion of the partition. The relatively high temperature of the exhaust also maintains the temperature within compartment 64 to become elevated. The passage of exhaust through tube 70 creates a relatively low pressure area on the inside of the tube adjacent ports 72 which in turn causes the fumes and fluids entering the mixing compartment 60 through intake 38 from the crankcase to be drawn through the ports in typical venturi fashion. In this manner the vapor and fluids from the crankcase are mixed with the exhausts fluids and propelled into the heating chamber 64 where the crankcase pollutants are oxidized. Following this the intermixed fluids are passed through apertures 50 in partition 46 and into the filtering chamber 62 where the steel wool fibers 63 perform a filtering operation. After passage through the filtering station the mixture of fluids exit the pollution control device through outlet 42 and are returned to the engine combustion chambers through air filter housing 10 and carburetor 12. If desired, the carburetor may be bypassed and the returning fluids from the device passed directly into the engine intake manifold.

Figure 5:
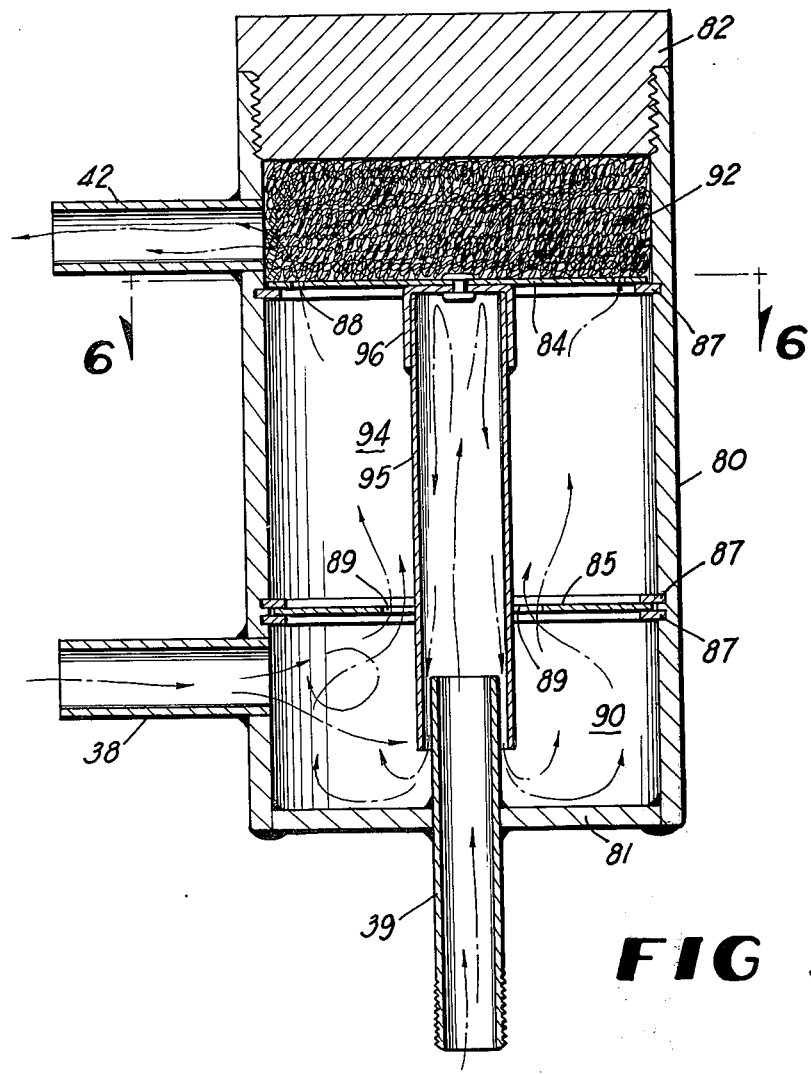
FIG. 5 is a transverse view in cross section of another embodiment of the pollution control device shown in FIG. 1.
Figure 6:
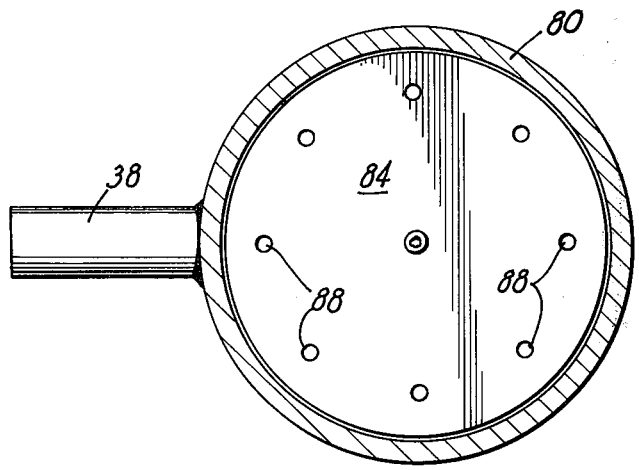
FIG. 6 is a cross sectional view of the device shown in FIG. 5 taken along plane 6—6.

With reference next to FIGS. 5 and 6, the pollution control device is shown in an alternative form as comprising a cylindrical, aluminum housing 80 sealed at one end by a centrally-apertured, aluminum end plate 81, and at the other end by a removable aluminum plug 82. The interior chamber of the device is compartmentalized by means of two spaced, stainless steel partitions 84 and 85 mounted transverse the axis of the cylindrical housing by a set of slip rings 87. Partition 84 is seen to include a set of relatively small apertures 88 arranged radially about the axis of the housing while partition 85 is seen to include a central opening 89 disposed along the housing axis. Partitions 84 and 87 thus serve to divide the interior of the device into a mixing and arresting compartment 90 disposed adjacent inlets 38 and 39, a filtering compartment 92 disposed adjacent outlet 42, and a heating compartment 94 disposed between the two partitions. A tube 95 is mounted within the device coaxially to housing 80. One end of this tube is pressfitted into a cup 96 mounted to partition 84. The other end of this tube passes through opening 89 in partition 85 into mixing and arresting compartment 90 in spaced relation about the end of inlet 39.

In operation, exhaust entering inlet 39 is directed through tube 95 onto cup 96 at relatively high velocities. This action causes particulated matter within the exhaust stream to be deposited onto cup 96. The high temperature of the exhaust also serves to maintain the temperature within compartment 94 elevated.

After striking the cupped end of the tube, the exhaust exits the tube and enters compartment 90 where it is mixed with the fumes and fluids entering from the crankcase. As these fumes enter they are somewhat arrested and slowed. After this deacceleration the mixtures of crankcase and exhaust fluids flow into compartment 94 where they are heated, thereby oxidizing hydrocarbons therein. Following this the heated fluids flow through apertures 88 into compartment 92 where they are filtered by stainless steel filters. From here the fluids exit the device through outlet 42 and are returned through conduit 41 to the engine carburetor.

We thus see that an improved method is provided for controlling the emission of pollutants from engine crankcases of internal combustion engines which has been found to actually increase gasoline mileage under selected driving conditions. In practicing this method a device is also provided which may be easily and inexpensively installed upon conventional internal combustion engines and which may be easily dismantled from the engine for routine servicing such as in cleaning of the interior components and changing of the filter. It should be noted that in routing the return fluids from the device to the filter housed within filter housing 10, some filtering will be conducted at two independent points. Therefore, if desired the filter element of the pollution control device itself may be omitted. Many other modifications may of course be made to the method and device shown without departure from the spirit and scope of the invention as set forth in the following claims.

What is claimed is:

1. A pollution control device for an internal combustion engine comprising a housing having a first inlet for receiving fluids from an engine crankcase, a second inlet for receiving fluids from an engine exhaust manifold, and an outlet for returning fluids to the engine combustion chambers; a first partition having an opening therethrough mounted within said housing between said inlets and said outlet to separate a fluid mixing compartment adjacent said inlets from a fluid heating compartment; a second partition having at least one aperture therethrough mounted within said housing between said first partition and said outlet to separate a fluid filtering compartment adjacent said outlet from said fluid heating compartment; and a tube having at least one port therein mounted within said housing and extending through said fluid mixing compartment between said second inlet and said first partition opening.

2. The pollution control device of claim 1 wherein the interior of said tube is smaller intermediate the ends thereof than at the ends thereof adjacent said first inlet and said first partition opening; and wherein said port is positioned intermediate the tube ends whereby fluids may be drawn by venturi action from said first inlet into said tube through said port.

3. The pollution control device of claim 1 wherein said tube is disposed along a tube axis, and wherein said second partition is disposed transverse said axis with said aperture disposed off said tube axis whereby fluids emitted from said tube strike and are baffled by said second partition prior to passing through said second partition aperture.

4. The pollution control device of claim 3 wherein said second partition has a plurality of apertures disposed radially about said tube axis adjacent the interior walls of said housing.

5. The pollution control device of claim 1 further comprising a filter disposed within said filter compartment adjacent said outlet.

6. The pollution control device of claim 1 wherein said housing is cylindrical and said tube is mounted coaxially within said cylindrical housing.

7. A pollution control device for an internal combustion engine comprising a housing having a first inlet for receiving fluids from an engine crankcase, a second inlet for receiving fluids from an engine exhaust manifold, and an outlet for returning fluids to the engine combustion chambers; a first partition having an opening therethrough mounted within said housing between said inlets and said outlet to separate a fluid mixing compartment adjacent said inlets from a fluid heating compartment; a second partition having at least one aperture therethrough mounted within said housing between said first partition and said outlet to separate a fluid filtering compartment adjacent said outlet from said fluid heating compartment; and a tube mounted within said housing and extending from about said second inlet within said fluid mixing compartment through said first partition opening and through said fluid heating compartment.

8. The pollution control device of claim 7 wherein an end of said tube distal said second inlet is sealed adjacent said second partition.

9. The pollution control device of claim 7 wherein an end of said tube proximal said second inlet is disposed in spaced relation coaxially about an end portion of said second inlet.

10. The pollution control device of claim 7 wherein said tube passes through said first partition opening in spaced relation with said first partition.

* * * * *